(12) United States Patent
Owusu et al.

(10) Patent No.: US 9,315,064 B2
(45) Date of Patent: Apr. 19, 2016

(54) MULTILAYER FILM FOR MULTI-PURPOSE INKJET SYSTEMS

(71) Applicant: Avery Dennison Corporation, Pasadena, CA (US)

(72) Inventors: Osei Owusu, Concord Township, OH (US); Vadim Zaikov, Perry, OH (US); Shanshan Wang, Mentor, OH (US); James Baker, Lyndhurst, OH (US); Wen-Li A. Chen, Rochester, NY (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 13/772,164

(22) Filed: Feb. 20, 2013

(65) Prior Publication Data
US 2013/0216738 A1 Aug. 22, 2013

Related U.S. Application Data

(60) Provisional application No. 61/600,744, filed on Feb. 20, 2012.

(51) Int. Cl.
*B41M 5/00* (2006.01)
*B41M 5/50* (2006.01)
(Continued)

(52) U.S. Cl.
CPC .................. *B41M 5/502* (2013.01); *B32B 7/12* (2013.01); *B32B 27/18* (2013.01); *B32B 27/20* (2013.01); *B32B 27/306* (2013.01); *B32B 27/308* (2013.01); *B32B 27/32* (2013.01); *B32B 27/40* (2013.01); *B41J 2/01* (2013.01); *B41M 5/52* (2013.01); *B41M 5/5254* (2013.01); *B32B 2264/101* (2013.01); *B32B 2264/102* (2013.01); *B32B 2264/107* (2013.01);
(Continued)

(58) Field of Classification Search
CPC .... B41M 5/508; B41M 5/5218; B41M 5/502; B41M 5/506; B41M 5/504; B41M 5/5254; B41M 5/5281
USPC ........................ 428/32.18, 32.22, 32.34, 32.35
See application file for complete search history.

(56) References Cited

U.S. PATENT DOCUMENTS

| 4,702,341 A | 10/1987 | Taga et al. |
| 5,060,981 A | 10/1991 | Fossum et al. |

(Continued)

FOREIGN PATENT DOCUMENTS

| CN | 1824721 A | 8/2006 |
| CN | 101041767 A | 9/2007 |

(Continued)

OTHER PUBLICATIONS

Written Opinion issued in corresponding IA No. PCT/US2013/026946 dated Aug. 20, 2014.

(Continued)

*Primary Examiner* — Betelhem Shewareged
(74) *Attorney, Agent, or Firm* — Avery Dennison Corporation (57) ABSTRACT

The present invention is directed to a printed substrate including a multilayer film having the following layered configuration: a print layer having a thickness of at least about 0.6 mils, which is receptive to eco-solvent inks, mild-solvent inks, latex inks, UV inks, or combinations thereof, and where the print layer includes one or more of eco-solvent inks, mild-solvent inks, latex inks, UV inks, or combinations thereof; a tie layer; a core layer; and an adhesive layer.

64 Claims, 3 Drawing Sheets

(51) Int. Cl.
- *B41J 2/01* (2006.01)
- *B41M 5/52* (2006.01)
- *B32B 7/12* (2006.01)
- *B32B 27/18* (2006.01)
- *B32B 27/20* (2006.01)
- *B32B 27/30* (2006.01)
- *B32B 27/32* (2006.01)
- *B32B 27/40* (2006.01)

(52) U.S. Cl.
CPC  *B32B 2307/3065* (2013.01); *B32B 2307/4026* (2013.01); *B32B 2307/41* (2013.01); *B32B 2307/414* (2013.01); *B32B 2307/71* (2013.01); *B32B 2307/726* (2013.01); *B32B 2307/746* (2013.01); *B32B 2307/75* (2013.01); *B32B 2553/00* (2013.01); *B41M 5/504* (2013.01); *B41M 5/506* (2013.01); *B41M 5/508* (2013.01); *B41M 5/5218* (2013.01); *B41M 5/5281* (2013.01); *Y10T 428/24802* (2015.01); *Y10T 428/24893* (2015.01)

(56) References Cited

U.S. PATENT DOCUMENTS

| | | | |
|---|---|---|---|
| 5,169,605 A | 12/1992 | Carpentier | |
| 5,314,713 A | 5/1994 | Mori et al. | |
| 5,508,105 A | 4/1996 | Orensteen et al. | |
| 5,562,962 A | 10/1996 | Tung | |
| 5,662,997 A | 9/1997 | Onishi et al. | |
| 5,672,413 A | 9/1997 | Taylor et al. | |
| 5,691,425 A | 11/1997 | Klein et al. | |
| 5,700,582 A | 12/1997 | Sargeant et al. | |
| 5,721,086 A | 2/1998 | Emslander et al. | |
| 5,755,929 A | 5/1998 | Kuroyama et al. | |
| 5,837,375 A | 11/1998 | Brault et al. | |
| 5,849,419 A | 12/1998 | Josephy et al. | |
| 5,853,899 A | 12/1998 | Anderson et al. | |
| 5,882,388 A | 3/1999 | Adair et al. | |
| 5,885,678 A | 3/1999 | Malhotra | |
| 5,888,635 A | 3/1999 | Yang et al. | |
| 5,981,045 A | 11/1999 | Kuwabara et al. | |
| 6,143,408 A | 11/2000 | Fujita | |
| 6,150,013 A | 11/2000 | Balaji et al. | |
| 6,156,403 A | 12/2000 | Cochran | |
| 6,165,593 A | 12/2000 | Brault et al. | |
| 6,207,361 B1 | 3/2001 | Greener et al. | |
| 6,225,381 B1 | 5/2001 | Sharma et al. | |
| 6,228,486 B1 | 5/2001 | Kittel et al. | |
| 6,261,670 B1 | 7/2001 | Hakomori et al. | |
| 6,280,027 B1 | 8/2001 | Lawrence et al. | |
| 6,403,202 B2 | 6/2002 | Gu et al. | |
| 6,436,496 B1 | 8/2002 | Rackovan et al. | |
| 6,447,883 B1 | 9/2002 | Chen et al. | |
| 6,461,706 B1 | 10/2002 | Freedman et al. | |
| 6,461,722 B1 | 10/2002 | Kittel et al. | |
| 6,555,213 B1 | 4/2003 | Koneripalli et al. | |
| 6,589,636 B2 | 7/2003 | Emslander et al. | |
| 6,592,700 B2 | 7/2003 | Wang et al. | |
| 6,599,593 B1 | 7/2003 | Niu et al. | |
| 6,632,485 B1 | 10/2003 | Tang et al. | |
| 6,663,947 B2 | 12/2003 | Freedman et al. | |
| 6,667,093 B2 | 12/2003 | Yuan et al. | |
| 6,712,532 B2 | 3/2004 | Look | |
| 6,726,969 B1 | 4/2004 | Balaji et al. | |
| 6,726,981 B1 | 4/2004 | Steinbeck et al. | |
| 6,761,969 B2 | 7/2004 | Li et al. | |
| 6,790,491 B2 | 9/2004 | Sebastian et al. | |
| 6,790,516 B2 | 9/2004 | Niepelt | |
| 6,793,859 B2 | 9/2004 | Emslander et al. | |
| 6,793,860 B2 | 9/2004 | Xing et al. | |
| 6,808,822 B2 | 10/2004 | Rajan et al. | |
| 6,821,583 B2 | 11/2004 | Shouldice et al. | |
| 6,830,803 B2 | 12/2004 | Vaidya et al. | |
| 6,841,204 B2 | 1/2005 | Nakamura et al. | |
| 6,846,524 B2 | 1/2005 | Ozawa et al. | |
| 6,866,904 B2 | 3/2005 | Nellis et al. | |
| 6,881,458 B2 | 4/2005 | Ludwig et al. | |
| 6,881,704 B2 | 4/2005 | Sakamoto et al. | |
| 6,919,113 B2 | 7/2005 | Therrian et al. | |
| 6,986,919 B2 | 1/2006 | Hladik et al. | |
| 7,022,385 B1 | 4/2006 | Nasser | |
| 7,166,156 B2 | 1/2007 | Parrinello et al. | |
| 7,384,672 B2 | 6/2008 | Chang et al. | |
| 7,534,479 B2 | 5/2009 | Utz et al. | |
| 7,641,947 B2 | 1/2010 | Chen et al. | |
| 7,651,747 B2 | 1/2010 | Chen et al. | |
| 7,655,296 B2 | 2/2010 | Haas et al. | |
| 7,691,784 B2 | 4/2010 | Yuki et al. | |
| 7,700,188 B2 | 4/2010 | Balaji et al. | |
| 7,799,851 B2 | 9/2010 | Hladik et al. | |
| 7,906,218 B2 | 3/2011 | Steichen et al. | |
| 7,910,519 B2 | 3/2011 | Majumdar et al. | |
| 7,935,398 B2 | 5/2011 | Park et al. | |
| 8,003,176 B2 | 8/2011 | Ylitalo et al. | |
| 2002/0009576 A1 | 1/2002 | Fu et al. | |
| 2002/0039642 A1 | 4/2002 | Inoue et al. | |
| 2002/0098327 A1 | 7/2002 | Ohta et al. | |
| 2002/0119274 A1* | 8/2002 | Yang et al. | 428/40.1 |
| 2002/0127361 A1* | 9/2002 | Sandt et al. | 428/40.1 |
| 2002/0164455 A1 | 11/2002 | Nishikawa et al. | |
| 2003/0035944 A1* | 2/2003 | Blackwell | 428/328 |
| 2003/0049415 A1 | 3/2003 | Pedginski et al. | |
| 2003/0072925 A1* | 4/2003 | Kiyama et al. | 428/195 |
| 2003/0096087 A1 | 5/2003 | Benenati et al. | |
| 2003/0157276 A1 | 8/2003 | Romano, Jr. | |
| 2003/0170405 A1 | 9/2003 | Parrinello et al. | |
| 2003/0180541 A1 | 9/2003 | Naik et al. | |
| 2003/0207051 A1 | 11/2003 | Kozumi | |
| 2004/0053013 A1* | 3/2004 | Kyono et al. | 428/195.1 |
| 2004/0058133 A1 | 3/2004 | Bilodeau | |
| 2004/0091645 A1 | 5/2004 | Heederik et al. | |
| 2004/0105940 A1 | 6/2004 | Parrinello et al. | |
| 2004/0105971 A1 | 6/2004 | Parrinello et al. | |
| 2004/0202840 A1 | 10/2004 | Do et al. | |
| 2005/0008794 A1 | 1/2005 | Graczyk et al. | |
| 2005/0019508 A1 | 1/2005 | Engel et al. | |
| 2005/0100687 A1 | 5/2005 | Dutton et al. | |
| 2005/0147807 A1 | 7/2005 | Haas et al. | |
| 2005/0153110 A1* | 7/2005 | Juby et al. | 428/195.1 |
| 2006/0001725 A1 | 1/2006 | Nagata et al. | |
| 2006/0204689 A1 | 9/2006 | Tsukamoto et al. | |
| 2006/0263564 A1 | 11/2006 | Steyaert | |
| 2006/0292317 A1 | 12/2006 | Parrinello et al. | |
| 2007/0048466 A1 | 3/2007 | Huynh | |
| 2007/0172608 A1 | 7/2007 | Tojo et al. | |
| 2007/0172609 A1 | 7/2007 | Williams | |
| 2007/0204493 A1 | 9/2007 | Foley et al. | |
| 2008/0085385 A1 | 4/2008 | Ylitalo et al. | |
| 2008/0166507 A1 | 7/2008 | Park et al. | |
| 2008/0280111 A1 | 11/2008 | Blackwell et al. | |
| 2008/0302470 A1 | 12/2008 | Sumita et al. | |
| 2009/0047449 A1 | 2/2009 | Snow | |
| 2009/0214837 A1 | 8/2009 | Albenice et al. | |
| 2009/0233067 A1 | 9/2009 | Doornheim et al. | |
| 2009/0286033 A1 | 11/2009 | Taghavi et al. | |
| 2009/0297820 A1 | 12/2009 | Kovalchuk et al. | |
| 2010/0112263 A1 | 5/2010 | Lorence et al. | |
| 2010/0143615 A1 | 6/2010 | Hsu et al. | |
| 2010/0215880 A1 | 8/2010 | Chu et al. | |
| 2010/0243151 A1 | 9/2010 | Stokes | |
| 2010/0247817 A1 | 9/2010 | Nakano et al. | |
| 2011/0012974 A1 | 1/2011 | Niu | |
| 2011/0027505 A1 | 2/2011 | Majumdar et al. | |
| 2011/0052843 A1 | 3/2011 | Dontula et al. | |
| 2011/0111146 A1 | 5/2011 | Williams | |
| 2011/0117299 A1 | 5/2011 | Kung et al. | |

FOREIGN PATENT DOCUMENTS

| | | |
|---|---|---|
| CN | 101205275 A | 6/2008 |
| CN | 101368073 A | 2/2009 |
| CN | 101434819 A | 5/2009 |

(56) References Cited

FOREIGN PATENT DOCUMENTS

| | | |
|---|---|---|
| CN | 101497680 A | 8/2009 |
| CN | 101544725 A | 9/2009 |
| CN | 101591511 A | 12/2009 |
| CN | 101619200 A | 1/2010 |
| CN | 101717468 A | 6/2010 |
| CN | 101717612 A | 6/2010 |
| CN | 101812277 A | 8/2010 |
| CN | 101864258 A | 10/2010 |
| CN | 101974299 A | 2/2011 |
| CN | 102020956 A | 4/2011 |
| CN | 102070741 A | 5/2011 |
| CN | 102190988 A | 9/2011 |
| CN | 102190990 A | 9/2011 |
| CN | 102190992 A | 9/2011 |
| CN | 102206476 A | 10/2011 |
| CN | 102226068 A | 10/2011 |
| CN | 102250566 A | 11/2011 |
| CN | 102268233 A | 12/2011 |
| CN | 102344522 A | 2/2012 |
| CN | 102382605 A | 3/2012 |
| EP | 0524626 | 1/1993 |
| EP | 1026215 | 8/2000 |
| EP | 1059379 | 12/2000 |
| EP | 1114734 | 7/2001 |
| EP | 1138518 | 10/2001 |
| EP | 1364800 | 11/2003 |
| EP | 1777243 | 4/2007 |
| EP | 1930171 | 6/2008 |
| JP | 08099458 | 4/1996 |
| JP | 10006654 | 1/1998 |
| JP | 10235815 | 9/1998 |
| JP | 10305533 | 11/1998 |
| JP | 10305534 | 11/1998 |
| JP | 11198555 | 7/1999 |
| JP | 11202536 | 7/1999 |
| JP | 11315257 | 11/1999 |
| JP | 2000168018 | 6/2000 |
| JP | 2000326622 | 11/2000 |
| JP | 2001071631 | 3/2001 |
| JP | 2003154612 | 5/2003 |
| JP | 2003220670 | 8/2003 |
| JP | 2003231226 | 8/2003 |
| JP | 2004083787 | 3/2004 |
| JP | 2004090380 | 3/2004 |
| JP | 2004223811 | 8/2004 |
| JP | 2004331899 | 11/2004 |
| JP | 2005132032 | 5/2005 |
| JP | 2005238694 | 9/2005 |
| JP | 2006021354 | 1/2006 |
| JP | 2006052298 | 2/2006 |
| JP | 2006150653 | 6/2006 |
| JP | 2006274220 | 10/2006 |
| JP | 2007037900 | 2/2007 |
| JP | 2007038677 | 2/2007 |
| JP | 2007050620 | 3/2007 |
| JP | 2007111867 | 5/2007 |
| JP | 2007118584 | 5/2007 |
| JP | 2007160746 | 6/2007 |
| JP | 2007237438 | 9/2007 |
| JP | 2007296827 | 11/2007 |
| JP | 2007297569 | 11/2007 |
| JP | 2008012716 | 1/2008 |
| JP | 2008062611 | 3/2008 |
| JP | 2008073871 | 4/2008 |
| JP | 2008087173 | 4/2008 |
| JP | 2008105356 | 5/2008 |
| JP | 2008221689 | 9/2008 |
| JP | 2009172888 | 8/2009 |
| JP | 2010069687 | 4/2010 |
| JP | 2010076183 | 4/2010 |
| JP | 2010094974 | 4/2010 |
| JP | 2010229291 | 10/2010 |
| JP | 2010253704 | 11/2010 |
| JP | 2010253759 | 11/2010 |
| JP | 2010253892 | 11/2010 |
| JP | 2010269583 | 12/2010 |
| JP | 2011021134 | 2/2011 |
| JP | 2011032355 | 2/2011 |
| JP | 2011051303 | 3/2011 |
| WO | WO0013887 | 3/2000 |
| WO | WO0013888 | 3/2000 |
| WO | WO2010005452 | 1/2010 |
| WO | WO2010091346 | 8/2010 |
| WO | WO2011146188 | 11/2011 |

OTHER PUBLICATIONS

International Search Report issued in corresponding IA No. PCT/US2013/026946 dated Nov. 1, 2013.
International Preliminary Report on Patentability issued in corresponding IA No. PCT/US2013/026946 dated Sep. 4, 2014.
Invitation to Pay Additional Fees issued in corresponding IA No. PCT/US2013/026946 dated Jun. 28, 2013.

* cited by examiner

MULTILAYER FILM FOR MULTI-PURPOSE INKJET SYSTEMS

CROSS-REFERENCE TO RELATED APPLICATION

The present application claims the benefit of U.S. Provisional Application No. 61/600,744 filed Feb. 20, 2012, which is incorporated herein by reference in its entirety.

FIELD

The present invention relates generally to multilayer films that are receptive to inkjet inks. More specifically, the present invention relates to co-extruded multilayer films that are receptive to multiple varieties of inkjet inks.

BACKGROUND

Multilayer films are utilized in various applications as printing substrates. For example, multilayer films may be utilized for packaging, signage and commercial graphic films for advertising and promotional displays.

Multilayer films may be used in association with inkjet printing. Inkjet printing is emerging as the digital printing method of choice because of its resolution, flexibility, high speed, and affordability. Inkjet printers operate by ejection, onto the multilayer film, controlled patterns of closely spaced ink droplets. By selectively regulating the pattern of ink droplets, inkjet printers can produce a variety of printed features.

SUMMARY

According to an aspect, the present invention provides a printed substrate including a multilayer film having the following layered configuration: a print layer having a thickness of at least about 0.6 mils, which is receptive to eco-solvent inks, mild-solvent inks, latex inks, UV inks, or combinations thereof, and where the print layer includes one or more of eco-solvent inks, mild-solvent inks, latex inks, Ultraviolet (UV) inks, or combinations thereof; a tie layer; a core layer; and an adhesive layer.

According to another aspect, the present invention is directed to a method of forming a multilayer film. The method includes coextruding layers of film forming materials to form the multilayer film having the following layered configuration: a print layer having a thickness of at least about 0.6 mils, which is receptive to eco-solvent inks, mild-solvent inks, latex inks, UV inks, or combinations thereof; a tie layer; a core layer; and an adhesive layer.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
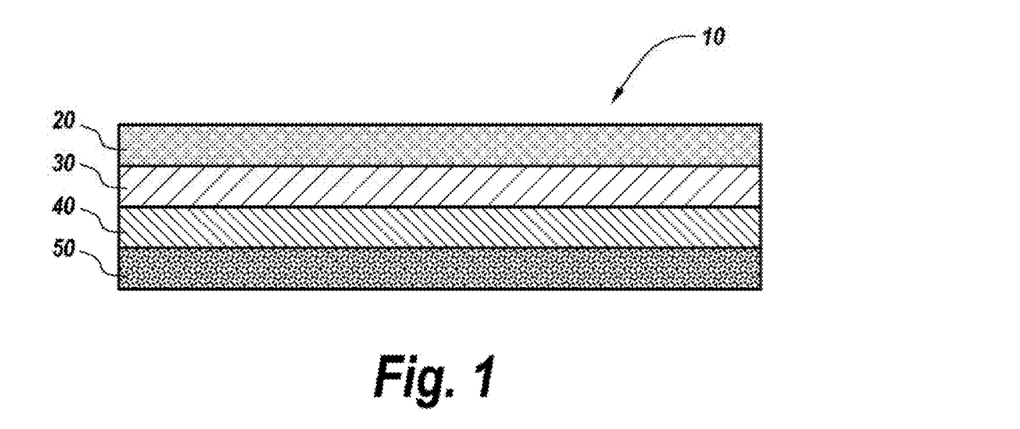
FIG. 1 is an enlarged side view of multilayer film in accordance with an first embodiment of the present invention.
Figure 2:
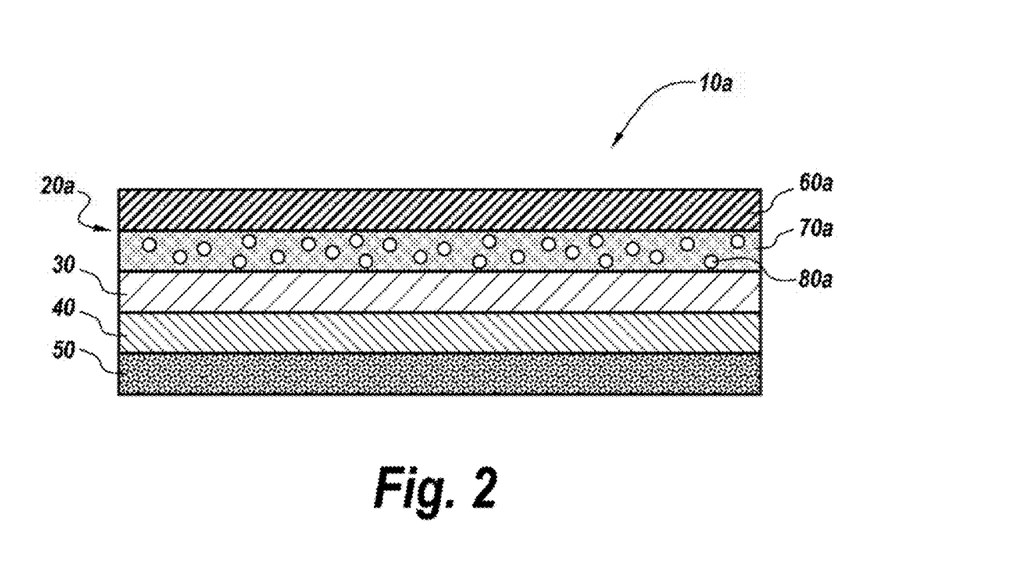
FIG. 2 is an enlarged side view of a multilayer film in accordance with a second embodiment of the present invention.

Multilayer films in accordance with embodiments of the present invention are shown in FIGS. 1 and 2. FIG. 1 illustrates an embodiment of multilayer film 10, in which multilayer film 10 includes a print layer 20, a tie layer 30, a core layer 40 and an adhesive layer 50. As shown in FIG. 1, multilayer film 10 is constructed by successively applying layers 20-50 to one another. Utilizing the present invention, print layer 20 may be utilized for the effective creation of a printed display, regardless of the type of inkjet ink utilized.

As indicated above, multilayer film 10 includes a print layer 20. Print layer 20 is receptive to multiple varieties of inkjet inks and displays the graphic image applied by such inks. Examples of various inkjet inks that may be applied to print layer 20 include, but are not limited to, hard-solvent (full-solvent) inks, eco-solvent inks, mild-solvent inks, latex inks, Ultraviolet inks, and combinations thereof. The particular application of the present invention will dictate the type of inkjet ink utilized.

Print layer 20 may be constructed of a thermoplastic material, such as polyurethane. Polyurethanes that may be useful as the print layer of the present invention include those sold under the trade names Irogran A80P4699L and A60E4902 and Krystalgran PN03-221, PN03-214, PN03-217, PN3429-218, and PN345-200, all from Huntsman International, LLC of The Woodlands, Tex. and Lubrizol 58277UV and Estane 58300 from The Lubrizol Corporation of Cleveland, Ohio, including blends thereof. In additional embodiments, print layer 20 may be constructed of copolymers. For example, in some embodiments, print layer may be constructed of an ethylene-methyl acrylate random copolymer, including those sold under the tradename Lotryl 29-MA 03 from Arkema of King of Prussia, Pa.

In some embodiments, print layer 20 may further include absorbing particles, for example, silica, alumina silicate, nano clay, and other absorbing particles known in the art. In such embodiments, the absorbing particles may make up between 0.1 and 40 weight percent of the total components of print layer 20.

In additional embodiments of the present invention, print layer 20 may also include one or more additives. For example, print layer 20 may include agents to reduce the coefficient of friction of print layer 20, anti-block agents, and/or light stabilizers. Such agents to reduce the coefficient of friction may be utilized to aid in the coextrusion process for the creation of multilayer film 10. In such embodiments, the agent utilized may include silica based in polypropylene, polyurethane or carrier resins that are compatible with the base resin. Suitable agents for use in the present invention include those sold under the trade names Ampacet 401198 from the Ampacet Corporation of Tarrytown, N.Y. ("Ampacet"); Polybatch AB-5 from A. Schulman, Inc., of Nashville, Tenn. and Irogran Matt Batch and Krystalgran Matt Batch from Huntsman International, LLC of The Woodlands, Tex.

As indicated above, print layer 20 may further include one or more light stabilizers. Such stabilizers include an ultraviolet (UV) light absorber and/or other light stabilizers. The one or more light stabilizers may be present in print layer 20 in an amount of between about 1,000 to about 20,000 (parts per million). A suitable light stabilizer for use in the present invention includes the stabilizer sold under the tradename Ampacet 10561 from Ampacet; which is identified as a UV stabilizer concentrate containing 20% by weight of a UV stabilizer and 80% by weight of a low density polyethylene carrier resin. Further useful light stabilizers are provided under the tradenames Ampacet 150380 and Ampacet 190303, both of which are color pigments.

In addition, as discussed above, print layer 20 may further include antiblock and/or slip additives. These additives may reduce the tendency of the film to stick together when it is in a roll form. The antiblock additives useful in connection with the present invention include natural silica, diatomaceous earth, synthetic silica, glass spheres, ceramic particles, and others. An example of an antiblock additive that may be included in the present invention includes Ampacet 401960 from Ampacet, which is identified as 5% by weight of polymethylmethacrylate (PMMA) in propylene homopolymer.

As provided in the Examples below, print layer 20 may be of a defined thickness in order to properly accommodate multiple varieties of inkjet inks. For example, in various embodiments, print layer 20 may have a thickness of at least about 1.0 mil, or at least about 0.75 mils. In further embodiments, print layer 20 may have a thickness of at least about 0.6 mils. Again, the required thickness of print layer will be dictated by the various applications in which the present invention may be utilized.

As illustrated in FIG. 1, tie layer 30 follows print layer 20. Tie layer 30 may be utilized to provide proper adherence between print layer 20 and core layer 40. Tie layer 30 may include one or more extrudeable resins, such as ethylene vinyl acetate resins, and modified polyolefins resins where such modified resins may be modified with acid, acrylate, or maleic anhydride, either individually or in various combinations. Some materials for use as tie layer 30 include those sold under the trade names Ateva 1821A and Atevea 2810A from Celanese Corporation of Dallas, Tex.; Lotader 3410, Lotader AX8900, Lotader 4603, and Lotryl 24MA005 from Arkema Inc. of King of Prussia, Pa.; Bynel 3861 and Bynel E418 from Dupont Corporation of Wilmington, Del.; and Plexar PX 1164 from LyondellBassell of Rotterdam, Netherlands. In further embodiments of the present invention, copolymers may be utilized in the construction of tie layer 30. For example, in some embodiments, tie layer 30 may be constructed of ethylene-methyl acrylaye-glycidyl methacrylate copolymer.

As indicated above and as illustrated in FIG. 1, core layer 40 of multilayer film 10 is adhered to tie layer 30 opposite print layer 20. Core layer 40 provides multilayer film 10 with the appropriate physical properties for the intended application(s) and may be constructed of any material suitable for those applications. For example, a polymer could be utilized for the construction of core layer 40 based on the polymer's flexibility or stiffness, durability, tear resistance, or other physical property. In addition, core layer 40 may aid in the graphic display application of multilayer film 10 with the use of additional dyes and/or pigments that may be added to core layer 40. For example, such additional materials may be utilized to provide a core layer that is white or opaque, color translucent, or colored opaque.

As indicated above, a polymer may be utilized in core layer 40 to provide the desired physical and graphic display qualities of multilayer film 10. In some embodiments, various forms of polypropylene and various forms of polyethylene, including high density polyethylene and low density polyethylene, may be utilized to construct core layer 40. Some examples of suitable polymers include those known as thermoplastic polyolefins such as FHR 43S2A Lgv, and FHR P4G3Z-050F from Flint Hills Resources, LP of Wichita, Kans.; Dowlex, Attane, Affinity, and Index polymers from Dow Chemical Co. of Midland, Mich.; ENGAGE polyolefins from DuPont Corporation; EXACT ethylene copolymers such as the D201 through 9018 series copolymers from Exxon Chemical Products of Houston, Tex.; and Colortech 110LT8859 from Colortech Inc. of Lebanon, Pa.

In additional embodiments, core layer 40 may be formed of multiple layers. In such embodiments, the multilayer aspect may be a product of the coextruding process utilized to construct multilayer film 10. Accordingly, in such embodiments, each of the multiple core layers 40 may be made of the same or different materials. For example, in embodiments where multiple core layers are utilized, the layer that makes contact with adhesive layer 50 may be constructed of an appropriate material so that proper adhesion is possible. In those embodiments, the opposite side of core layer 40 may be constructed of a material for proper connectivity and adhesion to tie layer 30. The particular application by the user will dictate the necessity of multiple core layers and the materials utilized.

In additional embodiments, core layer 40 may further include flame retardant materials. As discussed above, the present invention may be utilized on a number of different graphic displays. Utilizing a flame retardant material within core layer 40 may provide heightened levels of safety and security against possible hazards. In embodiments where a flame retardant material is utilized, various types of flame retardants may be used. In some embodiments, halogen free flame retardants may be utilized. For example, suitable flame retardant materials include those with the trade names FRC-2005PP from Polyfil Corporation of Rockaway, N.J. In embodiments where flame retardant materials are utilized, the amount of flame retardant materials may range from 0.001 to 5 weight percent of the materials utilized in core layer 40.

In additional embodiments, core layer 40 may also include light stabilizers similar to print layer 20. Such stabilizers may include an ultraviolet (UV) light absorber and/or other light stabilizers. The one or more light stabilizers may be present in core layer 40 in an amount of between about 1,000 to about 20,000 (parts per million). A suitable light stabilizer for use in the present invention includes the stabilizer sold under the tradename Ampacet 10561 from Ampacet, which is identified as a UV stabilizer concentrate containing 20% by weight of a UV stabilizer and 80% by weight of a low density polyethylene carrier resin.

In some embodiments, core layer 40 may further include one or more pigments to aid in providing core layer 40 with an opaque look. The amount of pigment included in core layer 40 may vary over a wide range. Pigments which may be included in core layer 40 may be metallic pigments, metallic powders such as aluminum, heavy metal-based pigments, heavy-metal free pigments, white or black pigments or organic pigments. The metallic pigments may include titanium dioxide, both rutile and anatase crystal structure, where the titanium dioxide may be coated or uncoated (e.g., aluminum oxide coated titanium dioxide) and may range in total weight of core layer 40 of between about 5% and about 50%. Examples of white pigments which may be utilized in the present invention include metallic pigments such as Polybatch White P8555 SD, available from A. Schulman Inc. of Nashville, Tenn. and which is identified as a white color concentrate having a coated rutile titanium dioxide concentration of 50% by weight in a propylene homopolymer carrier resin; and Ampacet 110235 which is a white pigmented polyethylene concentrate available from Ampacet. In addition, an example of a black pigment which may be utilized in the present invention includes Polyblak 4479-01 from A. Schulman Inc of Nashville, Tenn.

As shown in FIG. 1, multilayer film 10 further includes an adhesive layer 50 that is applied to core layer 40 opposite tie layer 30. Adhesive layer 50 may include any polymer materials, or other materials known in the art for enhancing adhesive anchorage to the adhesive layer. For example, adhesive layer 50 may utilize ethylene vinyl acetate, as well as varying forms of polyethylene, including high density and low density polyethylene, either individually or in combination with each other. Suitable examples for use in adhesive layer 50 may include FHR 43S2A Lgv and FHR P4G3Z-050F from Flint Hills Resources, LP of Wichita, Kans.; Ateva 1821A from Celanese Corporation of Dallas, Tex. and Dow DS6D81 from Dow Chemical Co. of Midland, Mich. As discussed above with respect to core layer 40, adhesive layer 50 may also include flame retardant materials to provide heightened levels of safety and security. In additional embodiments, as discussed with respect to print layer 20, adhesive layer 50 may also include agents for reducing the coefficient of friction of adhesive layer 50, as well as antiblock and/or slip additives. Such agents and additives that may be utilized for print layer 20 may also be used in adhesive layer 50.

FIG. 2 illustrates a second embodiment of the present invention. The multilayer film 10a of the second embodiment includes a print layer 20a that includes first print layer 60a and second print layer 70a. Materials suitable for print layer 20, as discussed above with respect to the first embodiment, may also be utilized for first and second print layers 60a and 70a. In addition, second print layer 70a may further include absorbing particles 80a, for example, silica, alumina silicate, nano clay, and other absorbing particles known in the art. Absorbing particles 80a may make up between 0.1 and 40 weight percent of second print layer 70a.

The multilayer films of the present invention may be created using polymeric coextrusion processes known in the art. For example, the coextrudate of polymeric film materials may be formed by simultaneous extrusion from two or more extruders, through a suitable known type of coextrusion die whereby the multilayer film layers are adhered to each other in a permanently combined state to provide a unitary coextrudate.

The multilayer films of the present invention provide advantages due to their versatility with respect to multiple varieties of inkjet inks. As the inventors have discovered, utilizing print layers with suitable thickness, as discussed herein, allow a multilayer film of the present invention to be receptive to a variety of different inkjet inks. Such discovery provides advantages over the current belief in the art that all varieties of inks cannot uniformly adhere to the same substrate and that the print layer or the print media has to be custom manufactured for each particular inkjet ink type. As industry has seen an increased emphasis on utilizing sustainable materials, the present invention can accommodate those inkjet inks that are more environmentally-friendly. For example, as shown in the Examples below, the present invention can provide graphic and display quality for eco-solvent and mild-solvent inks comparable to the hard-solvent inks that contain relatively-high concentrations of volatile organic compounds.

In addition, some of the additives utilized in the present invention may provide additional advantages. For example, as provided above, the use of flame-retardant materials within the multilayer films provide heightened levels of security and safety for those in contact with such films. Further, the use of agents to reduce the coefficient of friction in the print layer and the adhesive layer facilitate a more efficient coextrusion production of the multilayer films as the layers are less likely to stick to the idler rolls used in coextrusion production.

The following examples describe various embodiments of the present invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples.

EXAMPLES

Example 1

Example 1 is provided to illustrate the effectiveness of varying thicknesses of the print layer in use with various inks. Multilayer films in accordance with embodiments of the present invention were prepared utilizing the components shown in Table 1. In some formulations, silica particles were added to the print layer formulation as absorbing particles as shown in Table 2 and as explained above. Printing was conducted on all multilayer films using (1) Roland® Soljet Pro II XC-540 printer (available from Roland DGA Corporation of Irvine, Calif.) equipped with ECO-SOL Max inkjet inks, (2) Hewlett Packard Designjet L25500 printer (available from Hewlett Packard Company Palo Alto, Calif.) equipped with HP 789 latex inks, and (3) Mimacki JV330160 wide format inkjet printer (available from Mimacki USA, Inc. of Suwanee, Ga.) equipped with Mimacki SS21 mild solvent inks. The Hewlett Packard latex print utilized drying conditions of 113° F. and the curing temperature was set at 212° F. A photographic image having a range of print densities was chosen as the print image. The printed images were evaluated based on their ability to dry as the multilayer film exited the subject printer and on the print quality based on the color density and micro-cracks that were observed on the printed image. Table 2 shows the summary of the printing results.

TABLE 1

| Print Layer | Tie Layer | Core Layer (WT %) | Adhesive Layer (WT %) |
|---|---|---|---|
| Irogran A 80P4699L | Ateva 182A | Dowlex 2056G (40%) Colortech 110LT8859 (60%) | Dowlex 2056G (89) Ateva 1821A (10) Polybatch AB-5 (1) |

TABLE 2

| Print Layer Formulation | Print Layer Thickness (mils) | Mimacki JV330160 (SS21 mild solvent) | Roland XC-540 Soljet Pro II (Eco-sol max) | HP Deisgnjet L25500 (HP 789 latex ink) |
|---|---|---|---|---|
| Irogran A 80P4699L | 0.3-0.5 | Not fully dry | Not fully dry | Dry cracks |
| Irogran A 80P4699L | 0.8-1.2 | Dry No cracks | Dry to touch No cracks | Dry No cracks |
| Irogran A 80P4699L 15% silica | 0.3-0.4 | Not fully dry No cracks | Not fully dry | Dry Some cracks |
| Irogran A 80P4699L 15% silica | 0.6-0.8 | Dry to touch No cracks | Dry to touch | Dry, cracks |
| Irogran A 80P4699L 20% silica | 0.3-0.4 | Not fully dry | Not fully dry | Dry, Cracks |
| Irogran A 80P4699L 10% silica | 0.9-1.0 | Dry to touch No cracks | Dry to touch | Dry, No cracks |

Figure 3:
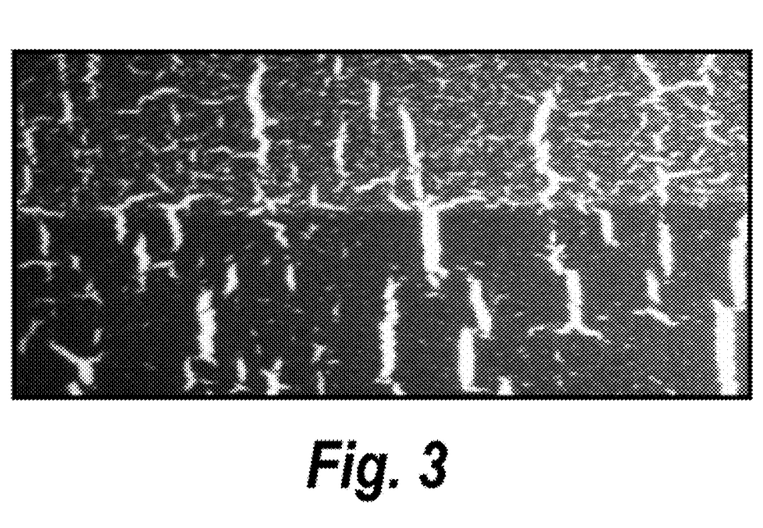
FIG. 3 is a top view of a multilayer film having a print layer thickness of 0.35 mils as discussed in Example 1.
Figure 4:
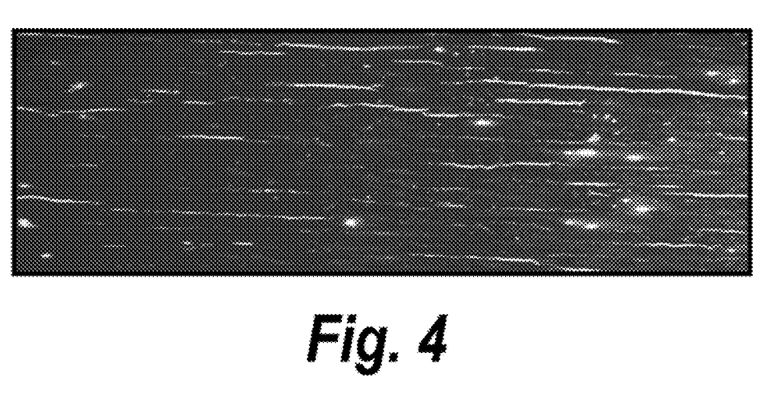
FIG. 4 is a top view of a multilayer film having a print layer thickness of 0.52 mils as discussed in Example 1.

As shown in Table 2, the ability of the multilayer films to achieve proper image quality with a variety of ink types is dependant on the thickness of the print layer. The results indicate that a print layer of at least 0.6 mils consistently provided a dry image with limited micro-cracks, regardless of the inkjet ink type. As illustrated in FIGS. 3 and 4, a print layer thickness of 0.35 mils (FIG. 3) and 0.52 mils (FIG. 4) results in micro-cracking that may not provide acceptable print quality.

Example 2

Example 2 is provided to further illustrate the effectiveness of varying thicknesses of the print layer in use with various inks. Multilayer films in accordance with embodiments of the present invention were prepared utilizing the components shown in Table 1, except that, where indicated in Table 3, polyurethane for the print layer of different grades and suppliers was utilized. The same inkjet inks and printers used in Example 1 were also used in Example 2. The results of the testing are shown below in Table 3.

TABLE 3

| Print Layer Formulation | TPU Layer Thickness (mils) | Mimacki JV330160 (SS21 mild solvent) | Roland XC-S40 Soljet Pro II (Eco-sol max) | HP Deisgnjet L25500 (HP 789 latex ink) |
|---|---|---|---|---|
| Irogan A 80P4699L | 0.96 | Dry/no cracks | Dry no cracks | Dry no cracks |
| Irogan A 80P4699L | 1.57 | Dry/no cracks | Dry/no cracks | Dry, no cracks |
| Irogan A 80P4699L | 1.12 | Dry/no cracks | Dry/no cracks | Dry, no cracks |
| Irogan A 80P4699L | 0.91 | Dry/no cracks | Dry/no cracks | No cracks |
| Irogan A 80P4699L | 0.88 | Dry/no cracks | Dry/no cracks | Dry, no cracks |
| Irogan A 80P4699L | 0.77 | Dry/no cracks | Dry/no cracks | Dry, no cracks |
| Irogan A 80P4699L | 0.44 | Wet/cracks | Cracks | Cracks |
| Irogan A 80P4699L | 0.42 | Wet/cracks | Cracks | Cracks |
| Irogan A 80P4699L | 0.48 | Cracks | Cracks | Cracks |
| Irogan A 80P4699L | 0.73 | Few cracks | Few cracks | Cracks |
| Lubrizol 58277UV | 0.91 | Dry, no cracks | Test Not Performed | Dry, no cracks |
| Lubrizol 58277UV | 0.72 | Dry, some cracks | Test Not Performed | Dry, no cracks |
| Krystalgran PN03-221 | 1.13 | Dry, no cracks | Test Not Performed | Dry, no cracks |

As further evidenced in Table 3, the ability of the multi-layer films to achieve proper image quality with a variety of ink types is dependant on the thickness of the print layer, regardless of the grade and supplier of the print layer polyurethane. The results provide that a print layer of at least 0.77 mils consistently provided a dry image with limited micro-cracks, regardless of the inkjet ink type.

Example 3

Example 3 is provided to further illustrate the effectiveness of the print layer of the present invention in use with various inks. Example 3 is a multilayer film produced using a conventional 7-layer blown film coextrusion process. Each of the seven extruders A, B, C, D, E, F, and G supplied a melt formulation to an annular die where the melts were combined to form a single molten stream. The layers and materials used are shown in Tables 4 and 5 below. In all cases, the resulting multilayer film had a total thickness of 2.5 mils to 3.0 mils. The print layer, which was created from the combination of the melt formulation of extruders A and B, had a total thickness of 0.96 mils.

TABLE 4

Sample 3A

| Extruder | Layer | Material | Supplier | WT % |
|---|---|---|---|---|
| A | Print | Irogran A 80P4699L | Huntsman | 100 |
| B | Print | Irogran A 80P4699L | Huntsman | 100 |
| C | Tie Layer | Lotader 3410 | Arkema | 100 |
| D | Core | Colortech 110LT8859 | Colortech | 60 |
|   |   | Dowlex 2056G FRC-2005PP | Dow | 39.5 |
|   |   |   | Polyfil | 0.5 |
| E | Core | Colortech 110LT8859 | Colortech | 60 |
|   |   | Dowlex 2056G FRC-2005PP | Dow | 39.5 |
|   |   |   | Polyfil | 0.5 |
| F | Core | Colortech 110LT8859 | Colortech | 60 |
|   |   | Dowlex 2056G FRC-2005PP BY-13069-F | Dow | 36.5 |
|   |   |   | Polyfil | 0.5 |
|   |   |   | A Schulman | 3.0 |
| G | Adhesive | Dowlex 2056 G Arteva | Dow | 88.5 |
|   |   | EVA 1821A FRC 2005PP Polybatch AB-5 | Celanese | 10 |
|   |   |   | Polyfil | 0.5 |
|   |   |   | A Schulman | 1.0 |

TABLE 5

Sample 3B

| Extruder | Layer | Material | Supplier | WT % |
|---|---|---|---|---|
| A | Print | Krystalgran PN03-221 | Huntsman | 100 |
| B | Print | Krystalgran PN03-221 | Huntsman | 100 |

TABLE 5-continued

Sample 3B

| Extruder | Layer | Material | Supplier | WT % |
|---|---|---|---|---|
| C | Tie Layer | Lotader 3410 | Arkema | 100 |
| D | Core | Colortech 110LT8859 | Colortech | 60 |
|   |   | Dowlex 2056G FRC-2005PP | Dow | 39.5 |
|   |   |   | Polyfil | 0.5 |
| E | Core | Colortech 110LT8859 | Colortech | 60 |
|   |   | Dowlex 2056G FRC-2005PP | Dow | 39.5 |
|   |   |   | Polyfil | 0.5 |
| F | Core | Colortech 110LT8859 | Colortech | 60 |
|   |   | Dowlex 2056G FRC-2005PP BY-13069-F | Dow | 36.5 |
|   |   |   | Polyfil | 0.5 |
|   |   |   | A Schulman | 3.0 |
| G | Adhesive | Dowlex 2056 G Arteva | Dow | 88.5 |
|   |   | EVA 1821A FRC | Celanese | 10 |
|   |   | 2005PP Polybatch | Polyfil | 0.5 |
|   |   | AB-5 | A Schulman | 1.0 |

The resulting multilayer films, designated as SAMPLE 3A for samples made with Irogran A80P4699L and SAMPLE 3B for samples made with Krystalgran PN03-221, were used in the printers listed below equipped with varying inkjet inks. The printers and inks used in Example 3 were (1) Mimacki JV33 printer with a mild-solvent ink; (2) HP 9000 Inkjet printer with a hard-solvent ink; (3) Epson GS6000 printer with an eco-solvent ink; (4) HP L25500 printer with a latex ink; (5) Mutoh VJ1204 printer with an eco-solvent ink; and (5) Roland XC-540 printer with an eco-solvent ink. Each of the print images resulting from the printer/ink combinations listed above on the multilayer films provided a dry image with limited micro-cracks.

Figure 5:
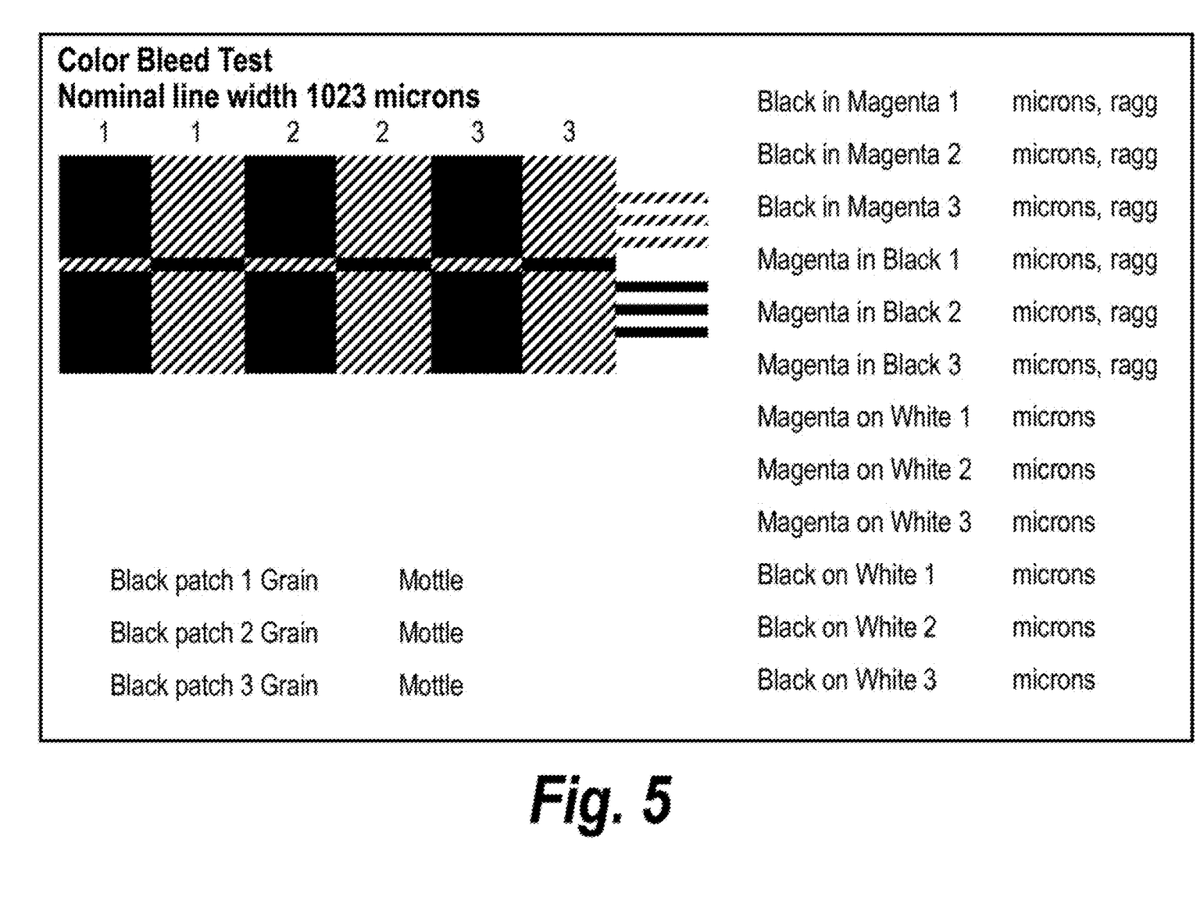
FIG. 5 is the QEA PIAS-II meter used for the color-bleed characteristics tests of Example 3.

The images obtained from the Roland XC-540 printer and the HP L25500 printer was further analyzed using the QEA PIAS-II meter (FIG. 5) to determine the dot size and ink bleeding characteristics of the print quality obtained from the two multilayer films of the present invention against a standard vinyl (non-sustainable) product of Avery Dennison Corporation of Pasadena, Calif. under the trade name MP12105. As provided in Table 6, the dot sizes were comparable to those applied to standard, non-sustainable products and reflect proper image quality.

TABLE 6

|   | Roland Eco-sol | | | | HP latex | | | |
|---|---|---|---|---|---|---|---|---|
|   | Mean | Min (μm) | Max (μm) | Stdv (μm) | Mean (μm) | Min (μm) | Max (μm) | Stdv (μm) |
| Sample 3A | 36.2 | 29.7 | 52.8 | 4.9 | 38.3 | 31.5 | 42 | 1.9 |
| Sample 3B | 39.5 | 29.3 | 57.6 | 5.6 | 41.7 | 32.6 | 47.6 | 2.4 |
| MPI2105 | 40.4 | 29.9 | 47.6 | 4.8 | 48 | 30.9 | 56.1 | 4 |

As indicated above, the color bleed characteristics were also measured using the QEA PIAS-II meter. The bleeding value was calculated as shown below:

$$\text{Bleeding Value} = (((1023\ \mu m - W_{min})/2) + (W_{max} - 1023\ \mu m/2))/2$$

$W_{max}$=Width of average black line in magenta area
$W_{min}$=Width of the average Magenta line in black area The results of the tests are shown in Table 7 below. Table 7 shows that the bleed characteristics of the multilayer films of the present invention are similar to the vinyl products and again reflect the similarly in the print quality between the multilayer films of the present invention and vinyl media.

TABLE 7

|   |   | Roland Eco-sol | | | HP Latex | | |
|---|---|---|---|---|---|---|---|
|   |   | width of black line in magenta area (μm) | width of magenta line in black area (μm) | Bleeding value | width of black line in magenta area (μm) | width of magenta line in black area (μm) | Bleeding value |
| Sample 3A | 1 | 1102 | 877 |   | 1085 | 869 |   |
|   | 2 | 1104 | 874 |   | 1090 | 874 |   |
|   | 3 | 1110 | 867 |   | 1083 | 878 |   |
|   | avg | 1105.3 | 872.7 | 58.2 | 1086.0 | 873.7 | 53.1 |
| Sample 3B | 1 | 1116 | 852 |   | 1089 | 867 |   |
|   | 2 | 1107 | 867 |   | 1084 | 865 |   |
|   | 3 | 1116 | 858 |   | 1082 | 875 |   |
|   | avg | 1113.0 | 859.0 | 63.5 | 1085.0 | 869.0 | 54.0 |
| MPI2205 | 1 | 1112 | 869 |   | 1075 | 898 |   |
|   | 2 | 117 | 877 |   | 1085 | 887 |   |
|   | 3 | 1133 | 869 |   | 1078 | 899 |   |
|   | avg | 1120.7 | 871.7 | 62.3 | 1079.3 | 894.7 | 46.2 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged in whole or in part. Furthermore, those of ordinary skill in the art will appreciate that the foregoing description is by way of example only, and is not intended to limit the invention so further described in such appended claims. Therefore, the spirit and scope of the appended claims should not be limited to the description of the versions contained therein.

What is claimed is:

1. A printed substrate comprising:
   a coextruded multilayer film having the following layered configuration:
      a print layer having a thickness of at least about 0.6 mils, which is receptive to eco-solvent inks, mild-solvent inks, latex inks, UV inks, or combinations thereof, wherein the print layer comprises one or more of eco-solvent inks, mild-solvent inks, latex inks, UV inks, or combinations thereof,
      a tie layer, a core layer, and an adhesive layer, wherein the tie layer is placed between the print layer and the core layer, and wherein the adhesive layer is applied to the core layer opposite to the tie layer wherein the print layer comprises a first print layer comprising polyurethane and a second print layer comprising polyurethane and absorbing particles.

2. The printed substrate of claim 1, wherein the print layer comprises a thermoplastic material.

3. The printed substrate of claim 1, wherein the print layer comprises polyurethane.

4. The printed substrate of claim 3, wherein the print layer further comprises absorbing particles.

5. The printed substrate of claim 1, wherein the print layer further comprises a light stabilizer and an antiblock additive.

6. The printed substrate of claim 1, wherein the print layer has a thickness of at least about 0.75 mils.

7. The printed substrate of claim 1, wherein the absorbing particles comprise silica, alumina silicate, or nano clay.

8. The printed substrate of claim 1, wherein the tie layer comprises ethylene vinyl acetate resin.

9. The printed substrate of claim 1, wherein the tie layer comprises a polyolefin resin modified with maleic anhydride.

10. The printed substrate of claim 1, wherein the core layer comprises polypropylene, polyethylene or mixtures thereof.

11. The printed substrate of claim 1, wherein the adhesive layer comprises a flame retardant.

12. A method of forming a coextruded multilayer film, the method comprising:

coextruding layers of film forming materials to form the multilayer film having the following layered configuration:

a print layer having a thickness of at least about 0.6 mils, which is receptive to eco-solvent inks, mild-solvent inks, latex inks, UV inks, or combinations thereof, a tie layer, a core layer, and an adhesive layer, wherein the tie layer is placed between the print layer and the core layer, and wherein the adhesive layer is applied to the core layer opposite to the tie layer wherein the print layer comprises a first print layer comprising polyurethane and a second print layer comprising polyurethane and absorbing particles.

13. The method of claim 12, wherein the print layer comprises a thermoplastic material.

14. The method of claim 12, wherein the print layer comprises polyurethane.

15. The method of claim 14, wherein the print layer further comprises absorbing particles.

16. The method of claim 12, wherein the print layer further comprises a light stabilizer and an antiblock additive.

17. The method of claim 12, wherein the print layer has a thickness of at least about 0.75 mils.

18. The method of claim 12, wherein the absorbing particles comprise silica, alumina silicate, or nano clay.

19. The method of claim 12, wherein the tie layer comprises ethylene vinyl acetate resin.

20. The method of claim 12, wherein the tie layer comprises a polyolefin resin modified with maleic anhydride.

21. The method of claim 12, wherein the core layer comprises polypropylene, polyethylene or mixtures thereof.

22. The method of claim 12, wherein the adhesive layer comprises a flame retardant.

23. A method of forming a printed substrate, the method comprising:

providing a coextruded multilayer film having the following layered configuration:

a print layer having a thickness of at least 0.6 mils, which is receptive to eco-solvent inks, mild-solvent inks, latex inks, UV inks, or combinations thereof, a tie layer, a core layer, and an adhesive layer; and applying one or more of eco-solvent inks, mild-solvent inks, latex inks, UV inks, or combinations thereof, wherein the tie layer is placed between the print layer and the core layer, and wherein the adhesive layer is applied to the core layer opposite to the tie layer wherein the print layer comprises a first print layer comprising polyurethane and a second print layer comprising polyurethane and absorbing particles.

24. The method of claim 23, wherein the print layer comprises a thermoplastic material.

25. The method of claim 23, wherein the print layer comprises polyurethane.

26. The method of claim 25, wherein the print layer further comprises absorbing particles.

27. The method of claim 23, wherein the print layer further comprises a light stabilizer and an antiblock additive.

28. The method of claim 23, wherein the print layer has a thickness of at least about 0.75 mils.

29. The method of claim 23, wherein the absorbing particles comprise silica, alumina silicate, or nano clay.

30. The method of claim 23, wherein the tie layer comprises ethylene vinyl acetate resin.

31. The method of claim 23, wherein the tie layer comprises a polyolefin resin modified with maleic anhydride.

32. The method of claim 23, wherein the core layer comprises polypropylene, polyethylene or mixtures thereof.

33. The method of claim 23, wherein the adhesive layer comprises a flame retardant.

34. A coextruded multilayer film receptive to inkjet inks, the multilayer film comprising:

a print layer having a thickness of at least about 0.6 mils, which is receptive to eco-solvent inks, mild-solvent inks, latex inks, UV inks, or combinations thereof, wherein the print layer comprises one or more of eco-solvent inks, mild-solvent inks, latex inks, UV inks, or combinations thereof;

a tie layer;

a core layer comprising a flame retardant; and an adhesive layer, the tie layer is placed between the print layer and the core layer and wherein the adhesive layer is applied to the core layer opposite to the tie layer wherein the print layer comprises a first print layer comprising polyurethane and a second print layer comprising polyurethane and absorbing particles.

35. The multilayer film of claim 34, wherein the print layer comprises a thermoplastic material.

36. The multilayer film of claim 34, wherein the print layer comprises polyurethane.

37. The multilayer film of claim 36, wherein the print layer further comprises absorbing particles.

38. The multilayer film of claim 34, wherein the print layer further comprises a light stabilizer and an antiblock additive.

39. The multilayer film of claim 34, wherein the print layer has a thickness of at least about 0.75 mils.

40. The multilayer film of claim 34, wherein the absorbing particles comprise silica, alumina silicate, or nano clay.

41. The multilayer film of claim 34, wherein the tie layer comprises ethylene vinyl acetate resin.

42. The multilayer film of claim 34, wherein the tie layer comprises a polyolefin resin modified with maleic anhydride.

43. The multilayer film of claim 34, wherein the core layer comprises polypropylene, polyethylene or mixtures thereof.

44. The multilayer film of claim 34, wherein the core layer comprises between about 0.01 and about 1.0 weight percent of the flame retardant.

45. The multilayer film of claim 34, wherein the core layer comprises about 0.5 weight percent of the flame retardant.

46. The multilayer film of claim 34, wherein the adhesive layer comprises a flame retardant.

47. The multilayer film of claim 46, wherein the adhesive layer comprises between about 0.01 and about 1.0 weight percent of the flame retardant.

48. The multilayer film of claim 46, wherein the adhesive layer comprises about 0.5 weight percent of the flame retardant.

49. A coextruded multilayer film receptive to inkjet inks, the multilayer film comprising:
   a print layer comprising a coefficient of friction lowering agent, the print layer having a thickness of at least about 0.6 mils, which is receptive to eco-solvent inks, mild-solvent inks, latex inks, UV inks, or combinations thereof, wherein the print layer comprises one or more of eco-solvent inks, mild-solvent inks, latex inks, UV inks, or combinations thereof;
   a tie layer;
   a core layer; and
   an adhesive layer, wherein the tie layer is placed between the print layer and the core layer, and wherein the adhesive layer is applied to the core layer opposite to the tie layer wherein the print layer comprises a first print layer comprising polyurethane and a second print layer comprising polyurethane and absorbing particles.

50. The multilayer film of claim 49, wherein the print layer further comprises thermoplastic material.

51. The multilayer film of claim 49, wherein the print layer comprises polyurethane.

52. The multilayer film of claim 50, wherein the print layer further comprises absorbing particles.

53. The multilayer film of claim 49, wherein the print layer further comprises a light stabilizer and an antiblock additive.

54. The multilayer film of claim 49, wherein the print layer has a thickness of at least about 0.75 mils.

55. The multilayer film of claim 49, wherein the absorbing particles comprise silica, alumina silicate, or nano clay.

56. The multilayer film of claim 49, wherein the print layer comprises between about 5 and 10 weight percent the coefficient of friction lowering.

57. The multilayer film of claim 49, wherein the coefficient of friction lowering agent comprises synthetic silica and polypropylene.

58. The multilayer film of claim 49, wherein the tie layer comprises ethylene vinyl acetate resin.

59. The multilayer film of claim 49, wherein the tie layer comprises a polyolefin resin modified with maleic anhydride.

60. The multilayer film of claim 49, wherein the core layer comprises low density polyethylene.

61. The multilayer film of claim 49, wherein the core layer comprises polypropylene, polyethylene or mixtures thereof.

62. The multilayer film of claim 49, wherein the adhesive layer comprises a flame retardant.

63. The multilayer film of claim 49, wherein the adhesive layer further comprises a coefficient of friction lowering agent.

64. The multilayer film of claim 63, wherein the wherein the coefficient of friction lowering agent of the adhesive layer comprises synthetic silica and polypropylene.

\* \* \* \* \*